United States Patent
Foster et al.

(10) Patent No.: US 9,529,364 B2
(45) Date of Patent: Dec. 27, 2016

(54) SYSTEM FOR COORDINATING AGRICULTURAL VEHICLE CONTROL FOR LOADING A TRUCK

(71) Applicant: CNH Industrial America LLC, New Holland, PA (US)

(72) Inventors: Christopher A. Foster, Mohntom, PA (US); Adam R. Rusciolelli, Chicago, IL (US); Tyson J. Dollinger, Mazon, IL (US); John Posselius, Ephrata, PA (US); Brian R. Ray, Chicago, IL (US); Todd S. Aznavorian, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/662,916

(22) Filed: Mar. 19, 2015

(65) Prior Publication Data
US 2015/0264866 A1    Sep. 24, 2015

Related U.S. Application Data (60) Provisional application No. 61/969,390, filed on Mar. 24, 2014.

(51) Int. Cl.
| | |
|---|---|
| G06F 7/70 | (2006.01) |
| G05D 1/02 | (2006.01) |
| B65G 67/24 | (2006.01) |
| B65G 67/04 | (2006.01) |
| B60P 1/00 | (2006.01) |
| A01B 69/00 | (2006.01) |
| A01D 41/12 | (2006.01) |

(52) U.S. Cl.
CPC ............ *G05D 1/021* (2013.01); *A01B 69/004* (2013.01); *B60P 1/00* (2013.01); *B65G 67/04* (2013.01); *B65G 67/24* (2013.01); *G05D 1/0261* (2013.01); *G05D 1/0291* (2013.01); *A01D 41/1217* (2013.01); *G05D 2201/0201* (2013.01)

(58) Field of Classification Search
USPC .......................................................... 701/50
See application file for complete search history.

(56) References Cited

U.S. PATENT DOCUMENTS

| | | | |
|---|---|---|---|
| 4,529,348 | A | 7/1985 | Johnson et al. |
| 5,978,720 | A | 11/1999 | Hieronymus et al. |
| 6,097,425 | A | 8/2000 | Behnke et al. |

(Continued)

FOREIGN PATENT DOCUMENTS

| | | |
|---|---|---|
| EP | 2044826 | 4/2009 |
| EP | 2098936 | 9/2009 |
| WO | WO03019430 | 3/2003 |

OTHER PUBLICATIONS

PCT/US2015/021974, International Search Report and Written Opinion dated Jun. 8, 2015, 9 pages.

*Primary Examiner* — Hussein A. Elchanti
(74) *Attorney, Agent, or Firm* — Rebecca L. Henkel; Rickard K. DeMille (57) ABSTRACT

A system is provided that automatically assesses weight rating characteristics of a truck and trailer combination. The system coordinates movement and unloading functions of the grain cart to automatically load the trailer to correspond to a target total weight value and a target weight distribution value based on axle weight ratings of the axles of the truck and trailer combination.

19 Claims, 3 Drawing Sheets

(56) References Cited

U.S. PATENT DOCUMENTS

| | | | |
|---|---|---|---|
| 6,148,255 A | 11/2000 | Van Der Lely | |
| 6,216,071 B1 | 4/2001 | Motz | |
| 6,247,510 B1 | 6/2001 | Diekhans et al. | |
| 6,292,729 B2 | 9/2001 | Falck et al. | |
| 6,301,530 B1 | 10/2001 | Tamura | |
| 6,313,758 B1 | 11/2001 | Kobayashi | |
| 6,314,348 B1 | 11/2001 | Winslow | |
| 6,568,161 B1 | 5/2003 | Paquet et al. | |
| 6,587,772 B2 | 7/2003 | Behnke | |
| 6,640,164 B1 | 10/2003 | Farwell et al. | |
| 6,643,576 B1 | 11/2003 | O'Connor et al. | |
| 6,675,074 B2 | 1/2004 | Hathout et al. | |
| 6,682,416 B2 | 1/2004 | Behnke et al. | |
| 6,732,024 B2 | 5/2004 | Rekow et al. | |
| 6,932,554 B2 | 8/2005 | Isfort et al. | |
| 7,063,614 B2 | 6/2006 | Vogelgesang et al. | |
| 7,209,822 B1 | 4/2007 | Linden | |
| 7,277,784 B2 | 10/2007 | Weiss | |
| 7,398,137 B2 | 7/2008 | Ferguson et al. | |
| 7,480,564 B2 | 1/2009 | Metzler et al. | |
| 7,537,519 B2 | 5/2009 | Huster et al. | |
| 2005/0197175 A1 | 9/2005 | Anderson | |
| 2006/0229804 A1 | 10/2006 | Schmidt et al. | |
| 2007/0037621 A1 | 2/2007 | Isfort | |
| 2008/0059007 A1 | 3/2008 | Whittaker et al. | |
| 2008/0109122 A1 | 5/2008 | Ferguson et al. | |
| 2008/0289308 A1 | 11/2008 | Brubaker | |
| 2009/0044505 A1 | 2/2009 | Huster et al. | |
| 2009/0126327 A1 | 5/2009 | Bussmann et al. | |
| 2009/0143939 A1 | 6/2009 | Rhodes et al. | |
| 2009/0306835 A1 | 12/2009 | Ellermann et al. | |
| 2009/0312919 A1 | 12/2009 | Foster et al. | |
| 2010/0017075 A1 | 1/2010 | Beaujot | |
| 2010/0042297 A1 | 2/2010 | Foster et al. | |
| 2010/0070144 A1 | 3/2010 | Burke et al. | |
| 2010/0070145 A1 | 3/2010 | Foster et al. | |
| 2011/0066337 A1* | 3/2011 | Kormann | A01D 43/073 701/50 |
| 2011/0203243 A1* | 8/2011 | Finkler | A01D 41/127 56/10.8 |
| 2012/0087771 A1* | 4/2012 | Wenzel | A01F 12/60 414/808 |
| 2012/0215394 A1 | 8/2012 | Wang et al. | |
| 2012/0302299 A1* | 11/2012 | Behnke | A01B 69/008 460/6 |
| 2013/0045067 A1* | 2/2013 | Pickett | A01B 69/008 414/345 |
| 2013/0213518 A1 | 8/2013 | Bonefas | |
| 2013/0227922 A1* | 9/2013 | Zametzer | A01D 43/073 56/10.2 R |
| 2013/0231823 A1 | 9/2013 | Wang et al. | |
| 2014/0083556 A1* | 3/2014 | Darr | A01D 43/087 141/1 |
| 2014/0224377 A1 | 8/2014 | Bonefas | |
| 2014/0311113 A1* | 10/2014 | Bonefas | A01D 34/001 56/10.2 R |
| 2015/0253427 A1* | 9/2015 | Slichter | G01C 21/20 356/5.01 |
| 2015/0287149 A1* | 10/2015 | Rosa | G06Q 50/02 705/7.39 |

* cited by examiner

SYSTEM FOR COORDINATING AGRICULTURAL VEHICLE CONTROL FOR LOADING A TRUCK

CROSS-REFERENCE TO RELATED APPLICATION

The present application claims the benefit of U.S. Ser. No. 61/969,390 filed Mar. 24, 2014.

FIELD OF THE INVENTION

The invention relates generally to agricultural harvesting equipment and, in particular, to grain harvesting equipment such as grain carts.

BACKGROUND OF THE INVENTION

Modern farming practices strive to minimize operating expenses. Improving efficiency of agricultural implements can help reduce operating expenses. To improve efficiency of agricultural implements, implements such as grain harvesting equipment like combines have been made larger with wider collection heads, which can reduce harvesting time of a field by requiring fewer passes. Another way to improve efficiency is by using techniques that increase the percentage of time the combine is spent harvesting. This can be done with grain carts that can be pulled alongside the combines during harvesting for unloading the combine grain bins into the grain carts while on-the-move. Unloading combine grain bins on-the-move allows for uninterrupted harvesting and increases efficiency of the combines while harvesting. Using grain carts to transport grain from combines to trailers of on-road trucks also allows the combine to continue harvesting uninterrupted during such transport and allows the trucks to stay out of the fields. Loading grain into truck trailers influences weight distribution and gross vehicle weight of the trucks and trailers. Operators of tractors towing the grain carts typically unload the grain carts to load the truck trailers. These grain cart tractor operators may not have Class A commercial drivers' licenses and therefore may have only a general awareness of how to load a truck to best comply with weight regulations for commercial motor vehicles. Some grain cart tractor operators may be seasonal help or otherwise not be full-time operators of the particular tractors they are using. In these situations, the grain cart tractor operators may be learning the controls of the tractor, the controls of the grain cart unloading systems, and trying to estimate how much and how to distribute the grain within the tractor trailers. This can lead to inefficiencies while unloading the grain carts to load the tractor trailers.

SUMMARY OF THE INVENTION

The present invention is directed to a system for automatically loading or automatically approaching and loading a trailer of the truck and trailer combination, such as a grain truck, with crop material.

The system allows operators without substantial loading and/or trucking experience to accurately load a trailer with grain or other crop material. The system assesses weight rating characteristics of the truck and trailer combination and a full-status of the trailer. The system coordinates movement of the grain cart and unloading functions of the grain cart to automatically load the trailer to correspond to a target total weight value and a target weight distribution value based on axle weight ratings of the axles the truck and trailer combination. This may allow for accurately loading a trailer, regardless of the skill level of the equipment operator.

According to one aspect of the invention, the system includes tractor and a grain cart towed by the tractor. The system has a control system including a tractor controller operatively communicating with a grain cart controller for controlling operation of the grain cart. A truck and trailer identification system facilitates identifying particular truck and trailer combinations for determining loading strategies based on weight rating characteristics of the truck and trailer combinations. A sensor system is arranged with respect to at least one of the tractor and grain cart for determining loading status of a trailer of the truck and trailer combination. The sensor system communicates with the control system for coordinating control of at least one of the tractor and the grain cart for achieving a target total weight value and a target weight distribution value of the truck and trailer combination.

According to another aspect of the invention, the truck and trailer identification system includes an RFID system, such as an active or passive RFID system having at least one RFID tag mounted to the truck and trailer combination. This allows for using radio transceivers and/or radio tagging/RFID to recognize specific truck and trailer combinations for determining exactly how much crop material can be loaded into the specific truck and trailer combination.

According to another aspect of the invention, the sensor system includes sensors mounted to the tractor, the grain cart, and/or the truck and trailer combination. The sensors can identify the geometry of the truck and trailer combination and/or the fill status or level of the trailer. The sensors can include, for example, various stereo vision cameras, 3D TOF cameras, IR cameras, ultrasonic sensors, and others.

According to another aspect of the invention, a harvesting implement loads grain or other harvested crop material into a grain cart towed by a tractor. The grain cart is moved to a truck and trailer combination. The truck and trailer combination may be defined by an over the road truck towing a trailer. The trailer may be a large hopper bottom trailer, such as a 42 foot hopper bottom grain trailer. A trailer loading sequence is initiated. The trailer loading sequence may be initiated automatically by the control system or by at least some operator manual input or confirmation. A target total weight value of crop material to load into the trailer is determined based on axle weight ratings of the axles of the truck and trailer combination. A target weight distribution value of the trailer is determined for distributing the crop material in the trailer based on the axle weight ratings of the axles of the truck and trailer combination. This determination may include evaluating the axle weight ratings based on the bridge gross weight formula, or other regulations. A grain cart unloading system is activated for transferring the crop material from the grain cart to the trailer to load the trailer. The tractor is controlled with a tractor controller to automatically move the tractor and correspondingly automatically move the grain cart relative to the trailer while the grain cart unloading system is activated. This automatically loads the trailer by way of the control system based on the determined target total weight of crop material and target weight distribution values.

According to another aspect of the invention, the tractor controller may identify the truck and trailer combination and determine the target total weight of crop material and target weight distribution values based on the identified truck and trailer combination. The tractor controller may cooperate with an RFID system for identifying the truck and trailer combination. The RFID system may include at least one RFID tag mounted with respect to the truck and trailer combination. The target total weight value of crop material to load into the trailer may be determined by identifying a target total weight value in a database corresponding to the identified truck and trailer combination. The target weight distribution value of the trailer may be determined by identifying a target weight distribution value in a database corresponding to the identified truck and trailer combination.

According to another aspect of the invention, the tractor controller may identify an orientation of the trailer relative to the grain cart and determine a path of motion of the grain cart based on the identified orientation of the trailer relative to the grain cart. Sensors are arranged with respect to at least one of the tractor and the grain cart for determining the orientation of the trailer relative to the grain cart. The tractor controller receives signals from the sensors corresponding to the orientation of the trailer relative to the grain cart. The control system can determine when the grain cart achieves a start-load position. When the grain cart achieves the start load position, the control system turns on a PTO (power takeoff) and increases an engine speed of the tractor in preparation for transferring the crop material from the grain cart to the trailer to load the trailer. A flow gate in the grain cart is opened to initiate crop material transfer from the grain cart to the trailer.

According to another aspect of the invention, a fill level of the trailer is determined and the tractor and the grain cart are moved relative to the trailer based on the determined fill level of the trailer. A first area of the trailer is loaded and a determination is made when the first area of the trailer reaches a first area required fill level. The first area required fill level corresponds to a component of the target total weight value as a function of the target weight distribution value relative to the first area. When the required fill level is achieved for the first area, the tractor and grain cart are moved for loading the crop material into a second area of the trailer. Movement from loading the first to loading the secondary of the trailer can be done without stopping the loading procedure. When the control system determines that a complete-full condition of the trailer has been achieved, a flow gate in the grain cart disclosed to stop crop material transfer from the grain cart to the trailer. The grain cart may not have enough crop material to completely fill the trailer to the target total weight value. After transferring all the crop material from the grain cart into the trailer, the control system may determine a partial-full condition of the trailer. The control system may store a partial-full value of the trailer in a memory that corresponds to the partial-full condition of the trailer. The grain cart is reloaded and at least some of the crop material from the subsequent load into the trailer based on the stored partial-full value.

According to another aspect of the invention, an initial fill level of the trailer may be determined before beginning transferring the crop material from the grain cart to the trailer, for example, by monitoring sensors. The tractor can be moved relative to the trailer until a partial-full area is detected and loading the partial-full area begins by transferring the crop material from the grain cart to the partial-full area of the trailer, According to another aspect of the invention, the system may include multiple grain carts that can communicate with each other to share information about fill status of a trailer for shared loading of the trailer or making other loading decisions such as which grain cart is best suited to load a particular trailer. A first grain cart may transfer less than the target total weight value of crop material into the trailer to define a partial-full condition of the trailer. The first grain cart broadcasts information corresponding to the partial-full condition of the trailer to a second grain cart. The second grain cart transfers additional crop material into the trailer to achieve the target total weight value.

According to another aspect of the invention, the tractor and grain cart may automatically approach the truck and trailer combination to initiate transfer of crop material from the grain cart to the trailer. The control system may search with sensors within a predetermined field of view and distance range for a truck and trailer combination and identify a proposed truck and trailer combination. An operator may confirm the proposed truck and trailer combination as suitable for loading The control system may move the tractor to approach the truck and trailer combination with the grain cart, position an unloading tube of the grain cart over the trailer, and transfer crop material from the grain cart into the trailer.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
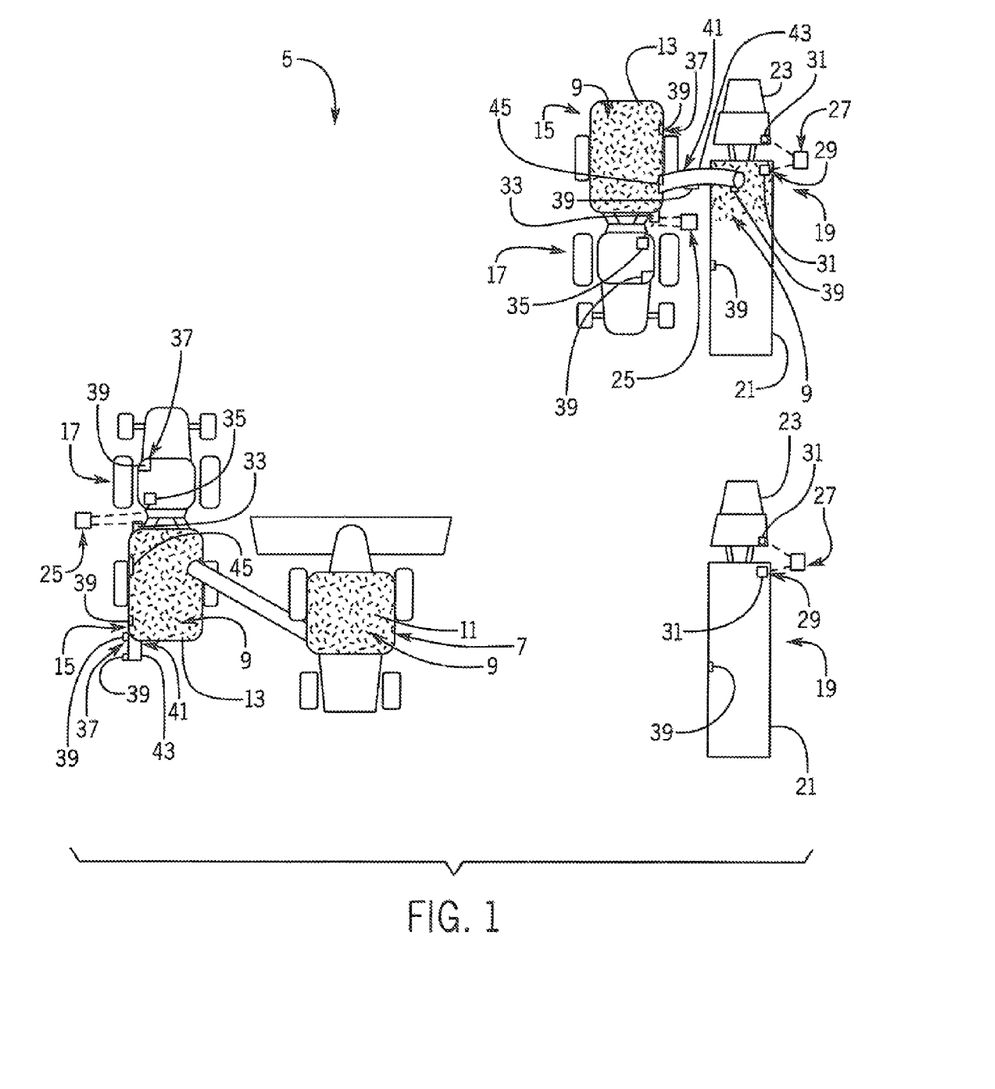
FIG. 1 is a simplified schematic representation of a system according to the present invention.

Referring now to the drawings and specifically to FIG. 1, a system 5 for coordinating vehicle control of agricultural vehicles for automatically loading and/or automatically approaching and loading crop material for on-road transport is schematically shown. System 5 includes a harvester such as a combine 7 that harvests grain and/or other crop material 9 from an agricultural field and stores the crop material in an onboard bin 11 of the combine 7. The combine 7 can unload its bin 11 while on-the-move into a bin 13 of grain cart 15 which may be a grain cart or grain wagon that is towed by a tractor 17. As shown here, multiple grain carts 15 and tractors 17 can be used for receiving crop material from the combine 7 and for hauling the crop material to truck and trailer combination(s) 19. The truck and trailer combination 19 includes the trailer 21 that may be a large hopper bottom trailer, such as a 42 foot hopper bottom grain trailer, and an over the road truck 23 for towing the trailer 21 over the road.

Still referring to FIG. 1, a control system shown as tractor/grain cart control system 25 cooperates with a truck and trailer identification system 27 for identifying particular truck and trailer combinations 19 for determining loading strategies based on weight rating characteristics of the truck and trailer combinations 19. The truck and trailer identification system 27 includes an RFID system 29. RFID system 29 can be an active or passive RFID system having at least one RFID tag 31 mounted to the truck and trailer combination 19 that operably communicates with and can be identified by the tractor/grain cart control system 25 for determining loading strategy for the particular truck and trailer combinations 19. This is done with cooperative RFID receiving-type components of the tractor/grain cart control system such as one or more RFID readers configured to operatively communicate with the RFID tag(s) 31 to allow for using radio transceivers and/or radio tagging/RFID to recognize specific truck and trailer combinations for determining exactly how much crop material can be loaded into the specific truck and trailer combination. Upon determining a loading strategy for a particular truck and trailer combination 19 by way of the truck and trailer identification system 27, the tractor/grain cart control system 25 coordinates at least some movement of the grain cart 15 and tractor 17 and at least some unloading functions of the grain can 15 to automatically load the trailer 21. The coordinated control of the grain cart 15 and tractor 17 allows for loading the trailer 21 to correspond to a target total weight value and a target weight distribution value based on axle weight ratings of the axles the truck and trailer combination 19 of the determined loading strategy. The target total weight and target weight distribution values for each of the particular truck and trailer combinations 19 can be stored in a database of the tractor/grain cart control system 25 for retrieval upon identifying each truck and trailer combination 19 with the truck and trailer identification system 27. Each target total weight value, target weight distribution value, or other loading strategy information stored in the database may be determined based at least in part on the bridge gross weight formula, or other regulations.

Still referring to FIG. 1, the tractor/grain cart control system 25 includes a grain cart controller 33 and a tractor controller 35 that operably communicate with each other, for example, by way of an ISOBUS connection. Each of the grain cart controller 33 and the tractor controller 35 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the grain cart 15 and tractor 17, respectively. This allows the tractor/grain cart control system 25 to coordinate controls of the grain cart 15 and tractor 17 based on information detected from the truck and trailer identification system 27 and/or from a sensor system 37 that communicates with the tractor/grain cart control system 25 for coordinating the loading of the trailer 21. Sensor system 37 has sensors 39 that are mounted to the grain cart 15, the tractor 17, and/or the truck and trailer combination 19. The sensors 39 are arranged to detect characteristics of the grain cart 15 and trailer 21, such as loading status of the trailer 21 which may include fill level(s) of the grain cart 15 and/or trailer 21 or particular zones or areas within the trailer 21, the position(s) of the grain cart 15 or its components relative to the trailer 21, geometry of the trailer 21, and orientation of the trailer 21 relative to the grain cart 15 and tractor 17. The sensors 39 can include, for example, various stereo vision cameras, 3D TOP cameras, IR cameras, ultrasonic sensors, a grain cart bin scale, and others that operably communicate with the tractor/grain cart control system 25.

The tractor/grain cart control system 25 coordinates movement of the tractor 17 and grain cart 15 as well as operations of the components of the grain cart 15 such as a grain cart unloading system 41 that can be activated for transferring the crop material 9 from the grain cart 15 into the trailer 21. The grain cart unloading system 41 includes an unloading tube 43 that is a conduit to receive crop material 9 from an auger drive of the grain cart unloading system 41. The unloading tube 43 can be selectively positioned to extend from the bin 13 of the grain cart 15 to direct the crop material 9 into the trailer 21 A flow gate 45 of the grain cart unloading system 41 is actuated to selectively permit flow of crop material 9 from the bin 13 for transfer through the unloading tube 43 into the trailer 21. The flow gate 45 is opened to allow transfer of the crop material 9 into the trailer 21 and closed to stop transfer of the crop material 9 into the trailer 21.

Figure 2:
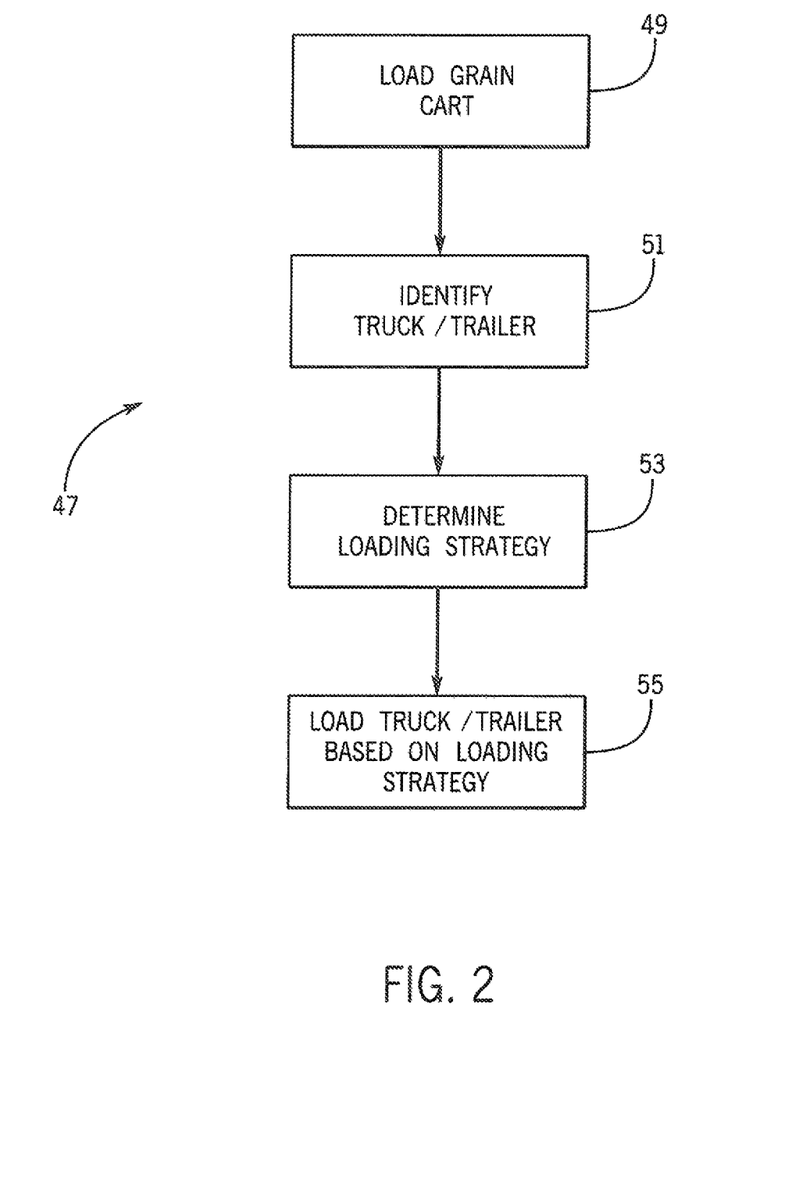
FIG. 2 is a flowchart showing a method for using the system of FIG. 1.

Referring now to FIG. 2 and with further reference to FIG. 1, an exemplary use of the system 5 (FIG. 1) is shown as method 47. As represented at block 49, the grain cart 15 is loaded with crop material 9 from the combine 7. The tractor 17 tows the grain cart 15 toward a truck and trailer combination 19. As represented at block 51, the tractor/grain cart control system 25 identifies the truck and trailer combination 19 through cooperation with the truck and trailer identification system 27. As represented at block 53, the tractor/grain cart control system 25 determines a loading strategy for the particular identified truck and trailer combination 19, based on the particular weight ratings of that truck and trailer combination 19. The loading strategy allows the trailer 21 to be loaded to correspond to a target total weight value and a target weight distribution value based on axle weight ratings of the axles the truck and trailer combination 19. As represented at block 55, the tractor/grain cart control system 25 controls the grain cart 15 and tractor 17 to load the trailer 21 according to the loading strategy.

Figure 3:
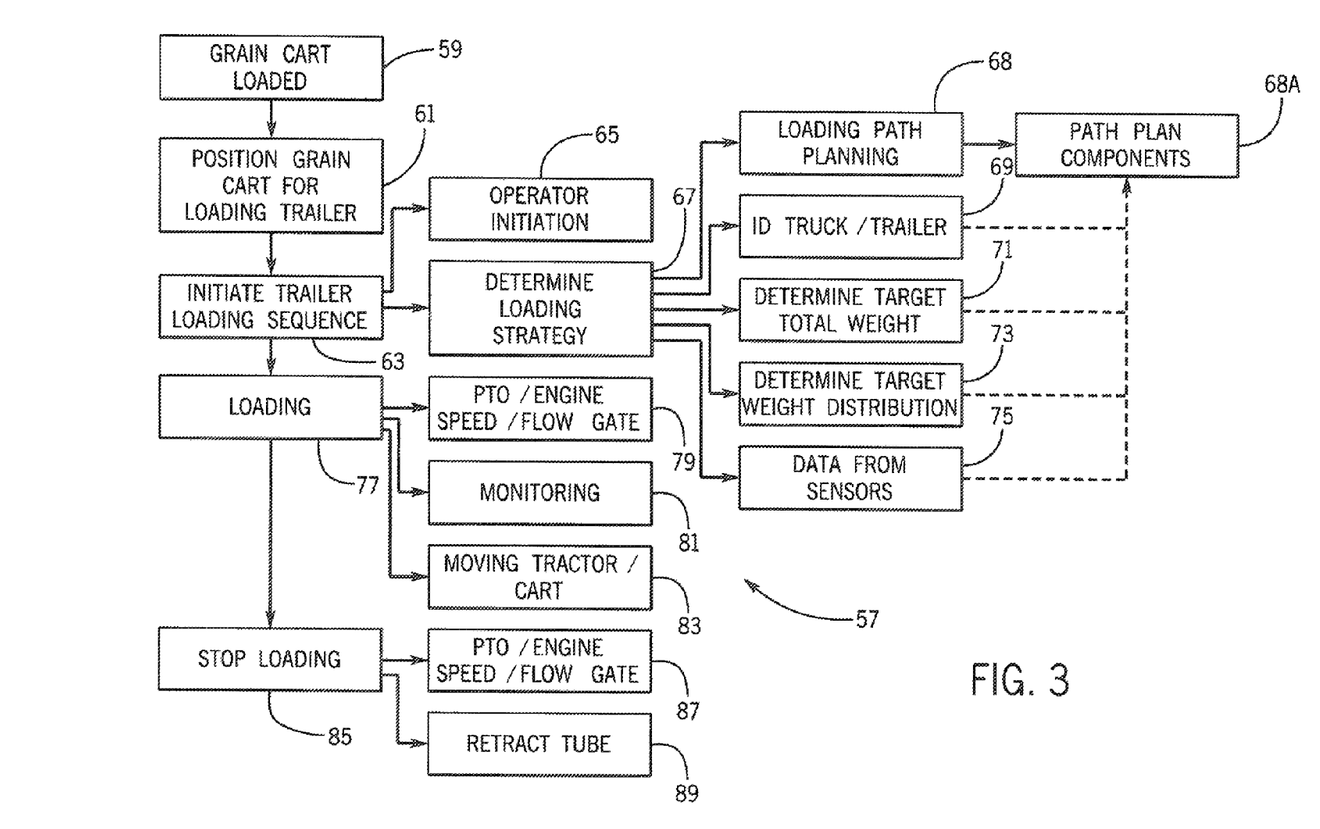
FIG. 3 is a flowchart showing a variant of the method of FIG. 2.

Referring now to FIG. 3 and with further reference to FIG. 1, another exemplary use of the system 5 (FIG. 1) is shown as method 57. As represented at block 59, the grain cart 15 is loaded and the tractor 17 tows the grain cart 15 to a truck and trailer combination 19. As represented at block 61, the grain cart 15 is positioned for loading the trailer 21. An operator extends the unloading tube 43 of the grain cart 15 over one end of the trailer 21. As represented at block 63, a trailer loading sequence is initiated. This may include the operator actuating a button or switch of a user interface of the tractor/grain cart control system 25 to initiate an automated trailer filling algorithm through the tractor/grain cart control system 25, as represented at block 65. As represented at block 67, tractor/grain cart control system 25 determines a loading strategy for the particular truck and trailer combination 19. This includes determining or planning a path of motion for loading the trailer 21, shown as loading path planning at block 68. As represented at block 68A, the loading path plan can include multiple plan components corresponding to various component orientation and control characteristics of the grain cart(s) 15 and tractor(s) 17 relative to components of the truck and trailer combination 19. Such plan components can include characteristics such as an approach path along which the grain cart 15 and tractor 17 move toward the trailer 21 to achieve a start position of the grain cart 15 and tractor 17 for transferring crop material 9 to the trailer 21. Other plan components can include a start position of the grain cart unloading system 41 relative to the trailer 21 or where the unloading tube 43 should be positioned over the trailer 21 when loading the trailer 21 begins, a travel direction of the grain cart 15 and tractor 17 when approaching and while loading the trailer 21, a travel speed of the grain cart 15 and tractor 17 when approaching and while loading the trailer 21, and a stop position of the grain cart unloading system 41 or where the unloading tube 43 should be positioned over the trailer 21 when crop transfer is stopped by control system 25. To determine the loading strategy 67, the tractor/grain cart control system 25 identifies the track and trailer combination 19 through cooperation with the truck and trailer identification system 27 as represented at block 69. The tractor/grain cart control system 25 determines a target total weight or how much total weight of crop material 9 can be loaded based on truck and trailer weight value information stored in the database as represented at block 71. The tractor/grain cart control system 25 determines a target weight distribution or till levels for the trailer 21 or different areas within the trailer 21 can be loaded based on trailer geometry information stored in the database as represented at block 73. Additional geometric data is collected by the tractor/grain cart control system 25 through the sensors 39, as represented at block 75. Control system 25 can consider the specific truck and trailer combination 19 identified at block 69, the corresponding determined target total weight and weight distribution at blocks 71, 73, and data and signals from the sensors at block 75 when determining the path plan components of block 68A. As represented at block 77, the grain cart 15 loads the trailer 21. This includes turning on the PTO, increasing engine speed to prepare for crop material transfer, and opening the flow gate 45 to initiate crop material transfer as represented at block 79. As represented by blocks 81 and 83, by way of sensors 39 that monitor fill level of the trailer 21, the tractor/grain cart control system 25 automatically moves the tractor 17 forward to fill a new area(s) of the trailer 21 when the area presently being filled reaches the target or required fill level. Once all areas of the trailer 21 are filled to the target or required fill levels, the tractor/grain cart control system 25 stops loading the trailer as represented at block 85 by closing the flow gate 45 to stop crop material transfer, reduces engine speed to idle, and disengages the PTO as represented at block 87 and retracts the unloading tube 43 as represented at block 89.

The grain cart 15 may not have enough crop material 9 to completely fill the trailer 21 to the target total weight value. After transferring all the crop material 9 from the grain cart 15 into the trailer 21, the tractor/grain cart control system 25 may determine a partial-full condition of the trailer. The tractor/grain cart control system 25 may store a partial-full value of the trailer 21 in memory that corresponds to the partial-full condition of the trailer 21. The grain cart 15 is reloaded with crop material 9 from the combine 7 and the crop material 9 is transferred into the trailer 21 based on the stored partial-full value. For example, the grain cart 15 can start a subsequent loading session at the same location or area of the trailer 21 that was being loaded when the grain cart 15 was emptied during the previous loading session. In another embodiment, an initial fill level of the trailer 21 may be determined before beginning transferring the crop material 9 from the grain cart 15 to the trailer 21, for example, by monitoring through the sensors 39. The tractor 17 can be automatically moved relative to the trailer 21 until a partial-full area is detected. A subsequent loading session will start at the detected partial-full area of the trailer 21.

In another embodiment, the multiple grain carts 15 and tractors 17 communicate with each other through wireless transfer of data through their respective tractor/grain cart control systems 25. This allows the grain carts 15 and tractors 17 to share information about fill status of a trailer 21 for shared loading of the trailer 21 or making other loading decisions such as which grain cart 15 is best suited to load a particular trailer 21. A first grain cart 15 may transfer less than the target total weight value of crop material 9 into the trailer 21 to define a partial-full condition of the trailer 21. The tractor/grain cart control system 25 of the first grain cart broadcasts information corresponding to the partial-full condition of the trailer 21 to the tractor/grain cart control system 25 of a second grain cart 15. The second grain cart 15 transfers additional crop material 9 into the trailer 21 to achieve the target total weight value.

In another embodiment, the tractor 17 and grain cart 15 may automatically approach the truck and trailer combination 19 to initiate transfer of crop material 9 from the grain cart 15 to the trailer 21. The tractor/grain cart control system 25 may search with the sensors 39 within a predetermined field of view and/or distance range for a truck and trailer combination 19 and identify a proposed truck and trailer combination 19. An operator may confirm the proposed truck and trailer combination 19 as suitable for loading. The tractor 1 grain cart control system 25 may move the tractor 17 to approach the truck and trailer combination 19 with the grain cart 15, position the unloading tube 43 of the grain cart 15 over the trailer 21, and transfer crop material 9 from the grain cart 15 into the trailer 21.

Many changes and modifications could be made to the invention without departing from the spirit thereof The scope of these changes will become apparent from the appended claims.

We claim:

1. A method for coordinating control of at least one agricultural vehicle for loading a trailer of a truck and trailer combination with a harvested crop material, the method comprising:
    harvesting crop material from a field with a harvester;
    directing the harvested crop material towards a grain cart adjacent the harvester;
    receiving the harvested crop material into the grain cart towed by a tractor;
    moving the grain cart from adjacent the harvester to a position adjacent to a truck and trailer combination defined by an over the road truck towing a trailer for hauling crop material;
    initiating a trailer loading sequence;
    determining a target total weight value of crop material to load into the trailer based on axle weight ratings of the axles of the truck and trailer combination;
    determining a target weight distribution value of the trailer for distributing the crop material in the trailer based on the axle weight ratings of the axles of the truck and trailer combination;
    activating a grain cart unloading system for transferring the crop material from the grain cart to the trailer to load the trailer;
    controlling the tractor with a tractor controller of a control system to automatically move the tractor relative to the trailer while the grain cart unloading system is activated to load the trailer based on the determined target total weight of crop material and target weight distribution values; and
    transferring crop material from the grain cart into the trailer, determining a partial-full condition of the trailer and storing a partial-full value of the trailer in a memory of the control system corresponding to the partial-full condition of the trailer, receiving a subsequent load of harvested crop material and transferring at least some of the crop material from the subsequent load into an area of the trailer based on the stored partial-full value.

2. The method of claim 1 wherein the crop material is grain.

3. The method of claim 1 wherein the control system identifies the truck and trailer combination and determines the target total weight of crop material and target weight distribution values based on the identified truck and trailer combination.

4. The method of claim 3 wherein the control system cooperates with an RFID (radio-frequency identification) system including at least one RFID tag mounted with respect to the truck and trailer combination for identifying the truck and trailer combination.

5. The method of claim 3 wherein the target total weight value of crop material to load into the trailer is determined by the control system identifying a target total weight value in a database corresponding to the identified truck and trailer combination.

6. The method of claim 3 wherein the target weight distribution value of the trailer is determined by the control system identifying a target weight distribution value in a database corresponding to the identified truck and trailer combination.

7. The method of claim 3 wherein a tractor operator positions an unloading tube of the grain cart before the control system automatically moves the tractor relative to the trailer.

8. The method of claim 3 wherein the control system identifies a relative orientation of the trailer relative to the grain cart and determines the path of motion of the grain cart based on the identified orientation of the trailer relative to the grain cart.

9. The method of claim 8 wherein sensors are arranged with respect to at least one of the tractor and the grain cart for determining the relative orientation of the trailer relative to the grain cart and wherein the control system receives signals from the sensors corresponding to the relative orientation of the trailer relative to the grain cart.

10. The method of claim 8 further comprising determining when the grain cart achieves a start-load position and wherein the control system commands at least one of (i) turning on a PTO(power takeoff) and increasing an engine speed of the tractor in preparation for transferring the crop material from the grain cart to the trailer to load the trailer, and (ii) opening a flow gate in the grain cart to initiate crop material transfer from the grain cart to the trailer.

11. The method of claim 1 further comprising sensors arranged with respect to at least one of the tractor and the grain cart for determining a fill level of the trailer and wherein the control system commands movement of the tractor and the grain cart relative to the trailer based on the determined fill level of the trailer.

12. The method of claim 11 further comprising loading a first area of the trailer and detecting when the first area of the trailer reaches a first area required fill level of the crop material, wherein the first area required fill level corresponds to a component of the target total weight value as a function of the target weight distribution value relative to the first area of the trailer, and automatically moving the tractor for loading the crop material into a second area of the trailer based on the detected reaching of the required fill level of the first area.

13. The method of claim 12 wherein when the control system determines a complete-full condition of the trailer corresponding to the target total weight value of crop material to load into the trailer, the control system commands closing a flow gate in the grain cart to stop crop material transfer from the grain cart to the trailer.

14. The method of claim 1 further comprising determining an initial fill level of the trailer before beginning transferring the crop material from the grain cart to the trailer and wherein during the determining of the initial fill level of the trailer, the control system moves the tractor relative to the trailer until the partial-full area is detected and wherein the control system commands beginning transfer of the crop material from the grain cart to the trailer at the partial-full area.

15. The method of claim 1 wherein the grain cart defines a first grain cart that transfers less than the target total weight value of crop material into the trailer to define the partial-full condition of the trailer, and wherein the first grain cart broadcasts information corresponding to the partial-full condition of the trailer to one or more other grain carts for transferring additional crop material from one of the first grain cart and the one or more other grain carts into the trailer to achieve the target total weight value.

16. The method of claim 1 wherein the control system controls the tractor and grain cart to automatically approach the truck and trailer combination to initiate transfer of crop material from the grain cart to the trailer, including
   detecting with sensors within a predetermined field of view and distance range for a truck and trailer combination;
   identifying a proposed truck and trailer combination;
   confirming the proposed truck and trailer combination as suitable for loading;
   moving the tractor to approach the truck and trailer combination with the grain cart;
   positioning an unloading tube of the grain cart over the trailer; and
   transferring crop material from the grain cart into the trailer.

17. A method for coordinating control of at least one agricultural vehicle for loading a trailer of a truck and trailer combination with a harvested crop material, the method comprising:
   harvesting crop material from a field with a harvester;
   directing the harvested crop material towards a grain cart adjacent the harvester;
   receiving the harvested crop material into the grain cart towed by a tractor;
   moving the grain cart from adjacent the harvester to a position adjacent to a truck and trailer combination having axle weight rating values stored in a database corresponding to ratings of axles of the truck and trailer combination;
   determining a loading path plan based on the axle weight rating values of the truck and trailer combination and a value of at least one of (i) a target total weight value of crop material to load into a trailer of the truck and trailer combination, and (ii) a target weight distribution value of the trailer for distributing the crop material in the trailer;
   controlling the tractor with a tractor controller to automatically move the tractor relative to a trailer of the truck and trailer combination based on the loading path plan; and
   transferring crop material from the grain cart into the trailer, determining a partial-full condition of the trailer and storing a partial-full value of the trailer in a memory of the control system corresponding to the partial-full condition of the trailer, receiving a subsequent load of harvested crop material and transferring at least some of the crop material from the subsequent load into an area of the trailer based on the stored partial-full value.

18. The method of claim 17 wherein the loading path plan includes plan components corresponding to a start position of the grain cart unloading system relative to the trailer, a travel direction of the tractor and grain cart, a travel speed of the tractor and grain cart, and a stop position of the grain cart unloading system relative to the trailer.

19. A system for coordinating control of at least one agricultural vehicle for loading a trailer of a truck and trailer combination with a harvested crop material harvested by a harvester, the system comprising:
 a tractor;
 a grain cart towed by the tractor, the grain cart being adapted for transport between a first position adjacent to a harvester for receiving the harvested crop material from the harvester and a second position adjacent to a truck and trailer combination for unloading the harvested crop material to the truck and trailer combination;
 a control system including a tractor controller operatively communicating with a grain cart controller for controlling operation of the grain cart, and a truck and trailer identification system for identifying weight rating information of a truck and trailer combination stored in a database accessible by the control system; and
 a sensor system arranged with respect to at least one of the tractor and grain cart for determining loading status of a trailer of the truck and trailer combination and communicating with the control system for automatically coordinating control of at least one of the tractor and the grain cart for achieving a target total weight value and a target weight distribution value of the truck and trailer combination;
 wherein the control system is configured to:
  determine a partial-full condition of the trailer in response to the transferring of the crop material from the grain cart into the trailer;
  store a partial-full value of the trailer in a memory of the control system corresponding to the partial-full condition of the trailer;
  broadcast information corresponding to the partial-full condition of the trailer to one or more other grain carts so as to course a subsequent load of harvested crop material to be transferred to an area of trailer based on the stored partial-full value.

* * * * *